United States Patent [19]

von Skwarski

[11] 4,062,491
[45] Dec. 13, 1977

[54] AUTOMATIC PLANT WATERING ARRANGEMENT

[76] Inventor: Bernhard von Skwarski, Bulgenbachweg 3, 1000 Berlin 28, Germany

[21] Appl. No.: 698,905

[22] Filed: June 23, 1976

[30] Foreign Application Priority Data

July 17, 1975 Germany .............................. 2532315

[51] Int. Cl.² ............................................ A01G 25/02
[52] U.S. Cl. .................................... 239/66; 137/624.2
[58] Field of Search ............... 137/624, 148.2; 222/63, 222/76, 70, 333, 528, 529; 239/66, 67, 70, 69, 76; 141/147

[56] References Cited

U.S. PATENT DOCUMENTS

| | | | |
|---|---|---|---|
| 2,875,428 | 2/1959 | Griswold | 239/69 X |
| 3,063,643 | 11/1962 | Roberts | 239/66 X |
| 3,390,860 | 7/1968 | Kavanau | 222/529 X |
| 3,780,766 | 12/1973 | Link | 239/70 X |
| 3,797,741 | 3/1974 | Spencer | 239/70 X |
| 3,827,459 | 8/1974 | Hunter | 239/70 X |

Primary Examiner—Stanley H. Tollberg
Assistant Examiner—Norman L. Stack, Jr.
Attorney, Agent, or Firm—Max Fogiel

[57] ABSTRACT

An automatic plant water arrangement having one water intake and several water outflows which are preceded by valves. The valves are actuated by a time-controlled mechanism, and are individually adjustable for different opening cycles. The time-controlled mechanism has a synchronous motor with a gear reduction unit, a single-tooth wheel and a mating gear with attached valve actuating disk. The valve actuation disk is provided with teeth, part of which are fixed and part of which are movable for opening the valve. A segment-shaped cam disk is located underneath the valve actuating disk, and is controlled by gears so that it pivots one of the movable teeth every sixth day into the valve engagement region. The teeth, after leaving the region are returned by springs to their initial positions.

18 Claims, 4 Drawing Figures

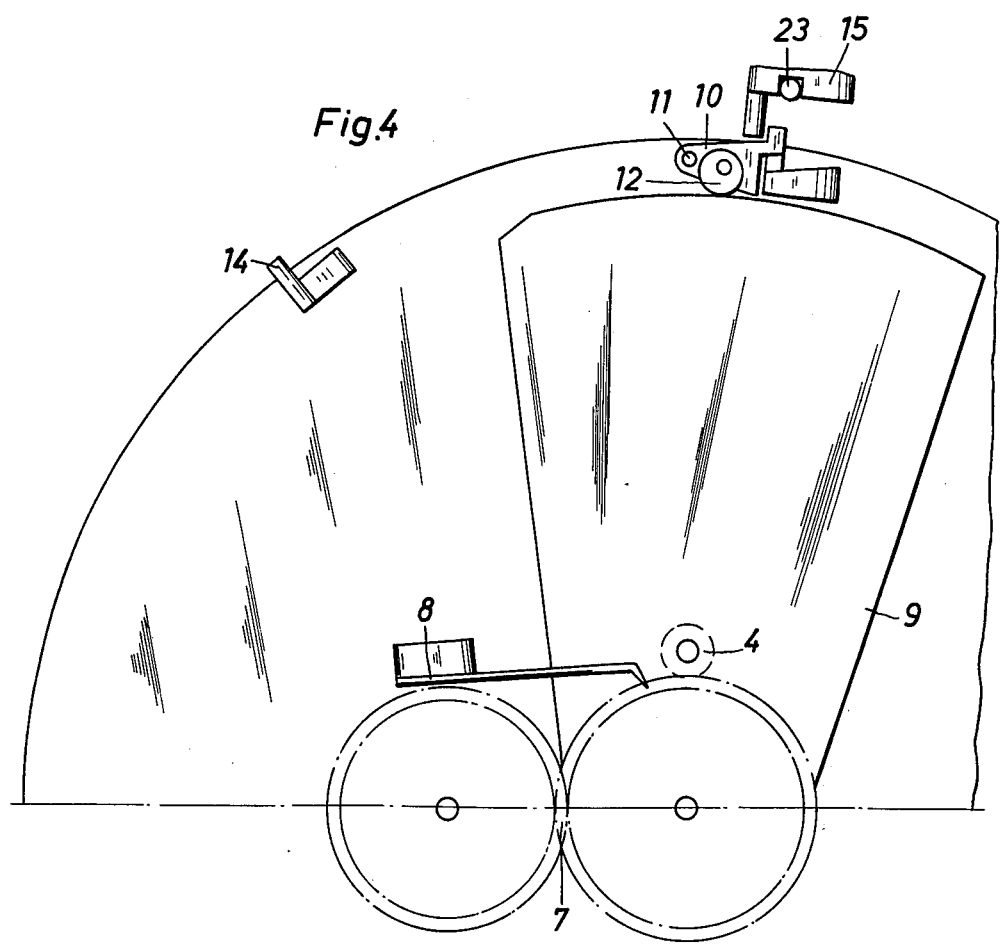

AUTOMATIC PLANT WATERING ARRANGEMENT

BACKGROUND OF THE INVENTION

The present invention relates to an automatic plant watering arrangement with a special valve actuating mechanism and several valves which can be individually adjusted for different opening time intervals.

The present invention makes possible the conversion from manual water of plants, flowers, etc. to automatic operation.

This watering arrangement is particularly useful when the manual water of plants in homes and offices during vacation periods becomes a problem.

With arrangement of this species as known in the art, individual watering of various plant types with only one arrangement is not possible. Accordingly, with these devices, it is very costly to achieve several different watering cycles which can be adjusted to the size and type of plant.

It is well-known that good growth of the various types of plants can be endured only if they are watered according to different, i.e., individual time cycles.

With arrangements known in the art, indivdiual watering depending on the plant type requires a complete watering arrangement, i.e., a single watering cycle requires a timer or another control device with motor pump or magnetic valve. The same applies to the watering interval control by means of an evaporation tank.

Furthermore, with the known devices it is relatively difficult to set or vary the required watering interval or to adapt it to the season.

It is, therefore, an object of the present invention to provide an automatic system of minimum size with simple operation and design and good reliability for watering various plants in accordance with their varying moisture requirements.

Thus, for example, the automatic watering system, analogously with manual watering, is to water several plants daily and others every 2nd, 4th, 6th or 8th day.

SUMMARY OF THE INVENTION

The objects of the present invention are achieved by providing that the automatic watering arrangement is connected to a water intke which in turn is connected to the public water system or to a water tank and has several water discharges which can be adjusted individually by means of rotary knobs for different water delivery cycles.

For economic reasons and in view of practical watering considerations, five different watering cycles are provided with the automatic system:
(a) daily, (b) every 2nd day, (c) every 4th day, (d) every 6th day, (e) every 8th day.

The five different watering cycles are made possible by a special mechanism which comprises a synchronous motor, a gear reduction box, a valve actuation disk, several valves, a motor pump and a water storage tank.

The design and the interaction of these components provide for the following functions:

The valve actuation disk is driven by the synchronous motor via the gear reduction drive. The outer circumference of the valve actuation disk has a total of 19 teeth which are located on the disk both one after the other and next to each other.

If the synchronous motor rotates the valve actuation disk via the drive, its teeth rotate in 5 adjacent circuit orbits that can be designated by letters $a$ through $e$.

In orbit $a$, 8 teeth, for example, rotate one behind the other at an angle interval of 45°. Next to it, in orbit $b$, four teeth rotate 90° apart. In orbit $c$, two teeth rotate 180° apart. In adjacent orbit $d$, four teeth rotate 90° apart; they are not fixed, but are movably attached to the valve actuation disk. Next to it, in orbit $e$, one tooth rotates (at 360° intervals). Within these orbits $a$ through $e$, there are several valves, in this case eight. Each of these valves has a worm-gear spindle by means of which the valve can be transferred to any orbit. The different watering or valve opening cycles result from the locations of the valves within these orbits associated with the valve actuation disk. Thus, the eight teeth which rotate in orbit $a$ make possible a daily opening of the valves located there. The four teeth in orbit $b$ and the two teeth in orbit $c$ effect valve openings with time intervals of two and four days. The single tooth rotating in orbit $e$ opens the valve at eight-day intervals.

The teeth which rotate in orbits $a$, $b$, $c$ and $e$ are solidly attached to the valve actuation disk. However, the four teeth of orbit $d$ are attached movable or pivoting on the valve actuation disk. A cam disk controlled by way of gears pivots (moves) one of these four movable teeth into the engagement (meshing) region of the valves every 6th day.

The periodically repeated valve openings result from the following function cycle:

The reduction gear, driven by the synchronous motor, has on its output shaft a gear with a single tooth. In the meshing region of this single-tooth gear is a gear with 64 teeth to which the valve actuation disk is attached.

The engagement of the single-tooth gear with the valve actuation disk takes place in 3-hour intervals. The time of engagemnt last 30 minutes. During this time interval, the single-tooth gear rotates the gear of the valve actuation disk by one tooth and the disk itself by 5.625°. Hence, in 24 hours the valve actuation disk is turned by 45° and in eight days by 360°. Consequently, the single tooth rotating in orbit $e$ engages the valve actuation disk only every 8th day. As a result, if there is a valve in this orbit, the 8-day watering cycle results. The 6-day watering cycle is achieved by locating next to the gear of the valve actuation disk, a double gear wheel with 48 and 56 teeth. The 64-teeth gear of the valve actuation disk meshes with the 48 teeth of the double gear wheel and transmits the resulting reduction via the 56 teeth to an equally large gear located beneath the valve actuation disk on its shaft. This gear is fastened to a segment-shaped cam disk which, because of the gear ratios $48:64 \times 56:56 \times 8 = 6$ makes one revolution in 6 days and moves one of the 4 movable teeth of the valve actuation disk into orbit $d$. All valves located in this orbit are opened by the extended tooth.

The special valves of this automatic arrangement have a space-saving design. The valve function "closing" is accomplished by simply clamping a hose.

The design of the valves is described in greater detail below:

The valve body is slotted on its face and, therefore, is fork-shaped. A crossbore passes through the prongs and holds an elastic and wearproof hose. The slot between the prongs holds a lever, the so-called hose clamping lever in a pivoting manner. A tension spring, whose one end is attached to the hose clamping lever and whose other end is attached to the valve body, pulls this lever against the hose and presses it against the fork base of the valve body. In order to clamp the valve hose to best advantage, a movable plate is located at the fork base of the valve body. This plate ensures that the clamping lever clamps the hose not on one side, but throughout the entire width.

The hose clamping lever is angled. Because of its shape, one end is within the engagement region of the valve actuation disk and the other end engages a pawl.

If one of the teeth of the valve actuation disk hits the bottom end of the hose clamping lever, the latter makes a tilting motion and moves away from the fork base of the valve, neutralizing the clamping pressure on the hose which up to now had been pinched. The valve is thereby opened. In the course of this valve opening, the hose clamping lever with its other end pushes the pawl against a pressure switch which in turn starts the pump motor. Now the plants will receive water through the opened valve hose up to the time when the pump motor is turned off.

The turning off of the pump motor is analogous with the turning on by the valve actuation disk. The valve actuation plate which turns 5.625° per cycle, during this process, engages the hose clamping lever over a range of four degrees. At the end of this engagement phase or of the four degree rotation, the valve actuation disk with its tooth has turned the hose clamping lever sufficiently so that it can slide past this tooth. Now the tension spring located between valve body and hose clamping lever returns the lever to its initial position. The valve hose is pinched and the valve is closed. At the same time, the pawl returns to its initial position and, via the pressure switch, turns off the pump motor. The watering cycle is ended.

In order to indicate the position of the valves within the orbits and hence the watering cycle selected, the automatic system is provided with a scale. This transparent scale, which is located above the valves, has printed lines and numbers which correspond to the orbits of the valve actuation disk.

The valves bear markers which end directly underneath the scale. If the spindles of the valves are turned, the valves, with their markers, move from one scale graduation to another. The set watering cycles are indicated by the coincidence of scale graduations and valve markers.

The automatic system also has an arrangement by means of which intermediate waterings are possible at any time and which has the purpose of flush deposits out of the entire watering system. This arrangement comprises a worm-gear spindle to which a dog, located underneath the pawl, is attached. By rotating the worm-gear spindle, the dog is drawn against the pawl; the latter tilts and turns on the pump motor. At the same time, the hose clamping levers engaged by the pawl are tilted till all valves are fully opened.

Miniature valves at the hose ends make possible accurate metering of the water quantities required by the individual objects to be watered. The miniature valves mount anchor pins which are stuck into the earth around the plants.

The automatic watering system and its control system may also be connected to the domestic water system. In that case, no water tank is required and a magnetic valve replaces the motor pump. Neither pump nor magnetic valve are necessary if the arrangement is located above the plants and hence the natural gradient of the water is acting while the valves are opened.

For safety reasons, i.e., to prevent water damage, the automatic system may also be equipped with a timer switch, e.g., a bi-metal switch. The timer switch is located in the power line between pressure switch and pump motor or magnetic valve, respectively. If the pump motor or the magnetic valve, after the watering interval is over, is not switched off due to defective operation, the timer switch after a safety waiting period interrupts the current flow to the motor or to the magnetic valve. This function may also set off an alarm.

The automatic watering system can be combined with a room fountain at small cost. For this purpose, a water catch basin is mounted on top of the water supply tank. On the bottom of this bowl, fountain nozzles (jets) are attached. From them, a hose leads to a magnetic valve and from there anothr hose leads to the water line system of the automatic arrangement. This magnetic valve is electrically connected in such a way that it is opened between the watering intervals and closed during watering. The motor pump, which in this case must operate continuously, with the magnetic valve opened, pumps water through the fountain jets; this water flows back to the water supply tank through the bowl whose bottom is perforated.

The novel features which are considered as characteristic for the invention are set forth in particular in the appended claims. The invention itself, however, both as to its construction and its method of operation, together with additional objects and and advantages thereof, will be best understood from the following description of specific embodiments when read in connection with the accompanying drawings.

BRIEF DESCRIPTION OF THE DRAWING

FIG. 4 is a partial plan view illustrating details of the valve control.

DESCRIPTION OF THE PREFERRED EMBODIMENTS

Figure 1:
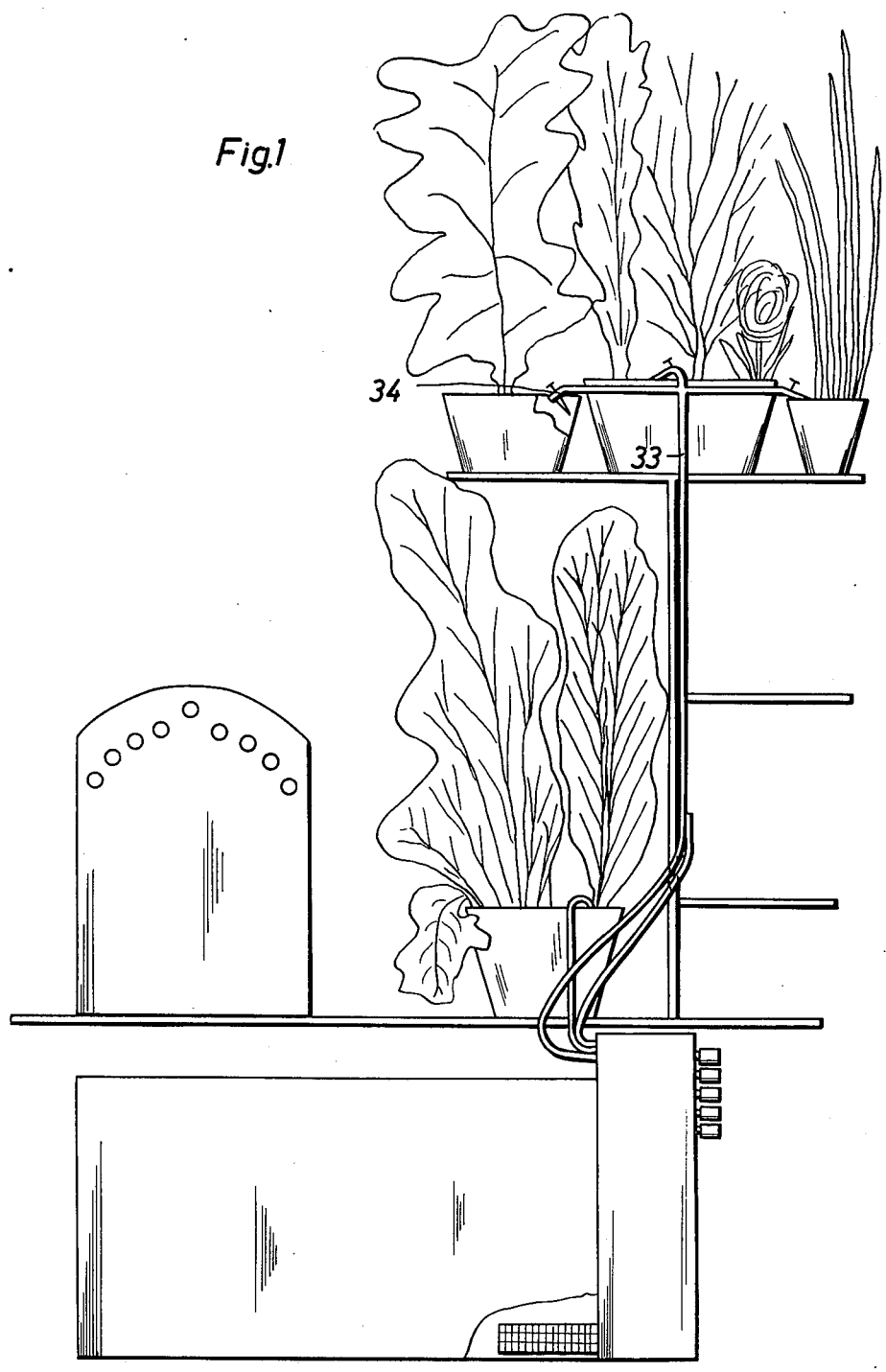
FIG. 1 is an elevational view and shows the outer form of the automatic watering system.
Figure 2:
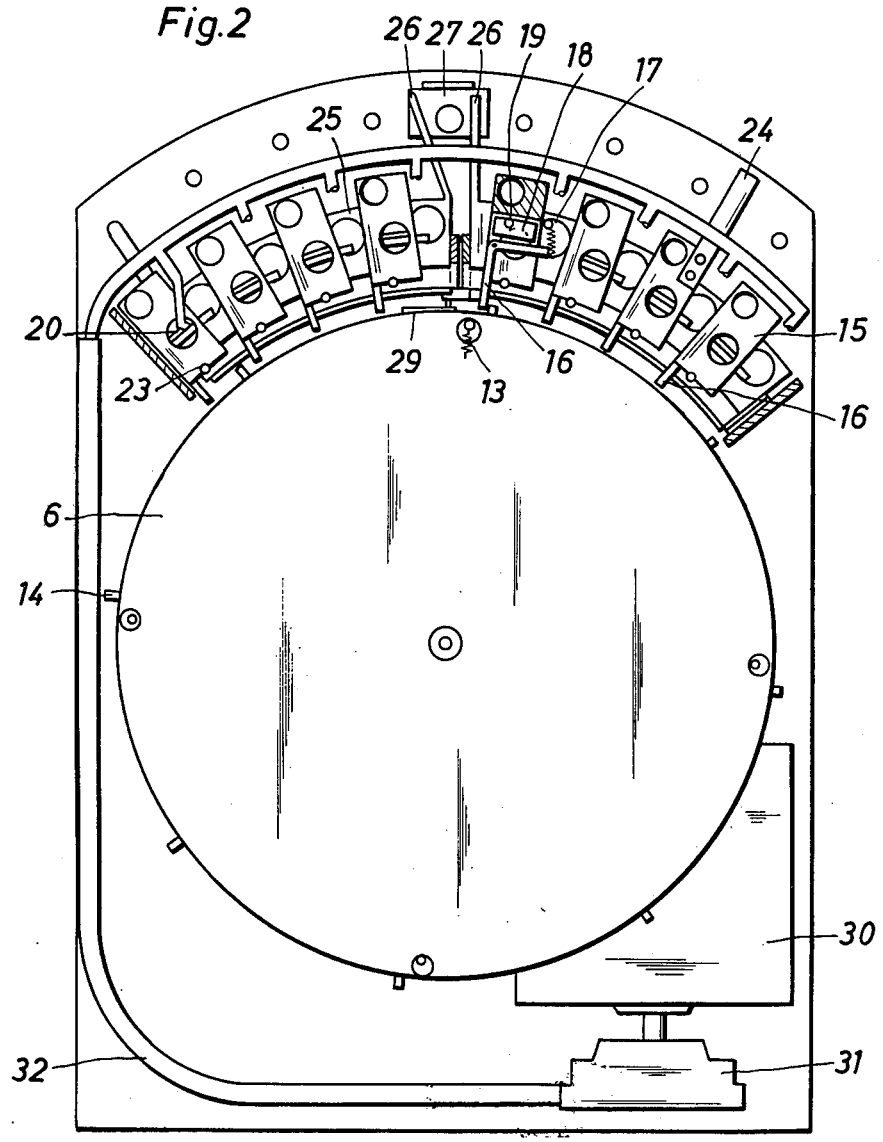
FIG. 2 shows the frontal view of the arrangement of the present invention, without cover hood.
Figure 3:
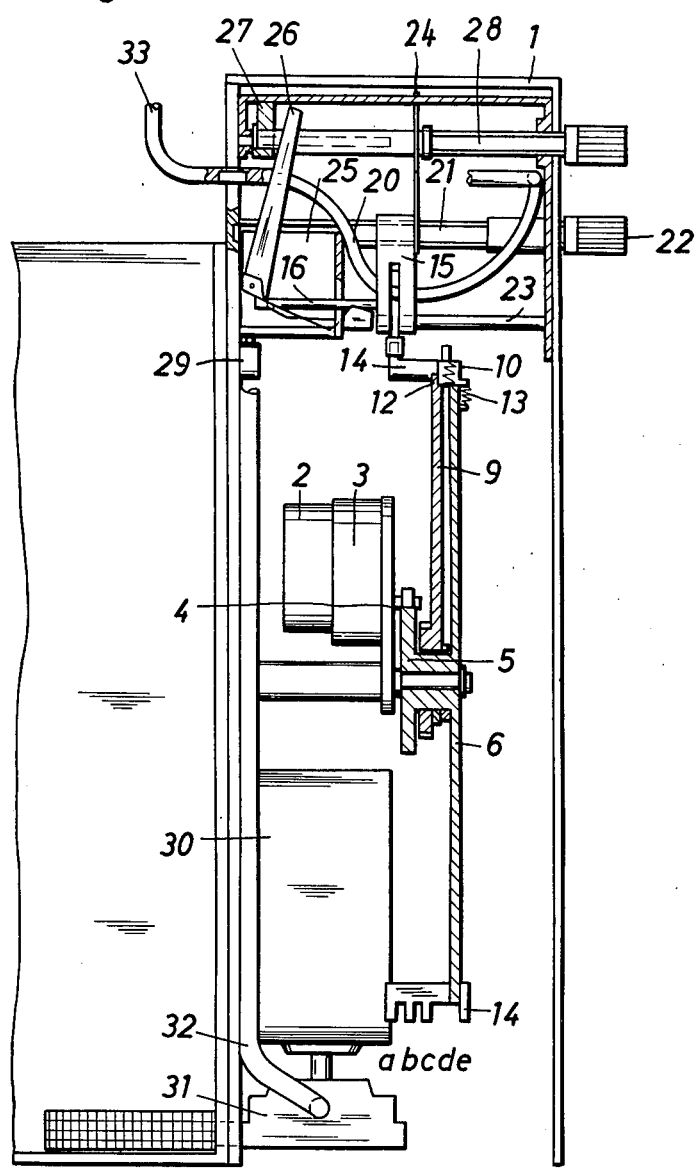
FIG. 3 shows a section taken through a side view.

FIG. 1 shows the cover hood 1 and the other form of the automatic system and the water storage tank. It also shows the arrangement of the control or rotary knobs 22. The arrangement, furthermore, shows hoses 33 which lead from the valve hoses 20 to the objects to be watered; the miniature valves 34 attached thereto are indicated there. FIG. 2 shows the pump 31 with attached water hose 32 which discharges into eight valve hoses 20. It also shows the front view of the valve actuation disk 6 and the associated valves 15; details are shown on the sectional view of one valve. The illustration shows the shape of the hose clamp lever 16 which, after being actuated by the valve actuation disk, is returned by spring 17 to its initial position, and whose rear end, as shown in FIG. 3, engages a pawl 25 which turns the pump motor 30 on and off via the switch 29.

In addition, this sectional view shows the plate 18 which is moved via a pin 19, thus ensuring proper clamping of valve hose 20. The valves are held at their positions by means of holding pins 23. The valve are moved along the circular orbits a through e by means of the worm-gear spindles 21.

All valves have markers 24 by means of which the set watering cycle can be read via the scale printed on the cover hood 1.

The valve are opened by the teeth 14 of the valve actuation disk 5. The functions of the teeth movably arranged on the valve actuation disk, are indicated in FIG. 4. The four teeth are pivoting, analogously to the tooth 10 shown, via pins 11. They are equipped with rollers 12 which are within the contact range of cam disk 9. The cam disk, through the gear transmission 7, swings one of the movable teeth into the engagement area of the valves every sixth day.

The valve actuation disk and the cam disk are driven by synchronous motor 2 with gear reduction 3. The output shaft mounts a one-tooth wheel 4 which engages the gear of valve actuation disk 5. Outside this engagement time, the valve actuation disk and the gear transmission 7 connected thereto are held by retaining spring 8.

The arrangement which makes possible intermediate waterings and the flushing of the water circulating system and hence its cleansing from deposits is shown in FIGS. 2 and 3. The dog 27 shown there, during rotation of the worm gear spindle 28, presses the levers of pawls 25 in the direction of the cover hood 1. Through this process, both pawls trip a switch and turn on the pump motor. Simultaneously, all hose clamping levers, since they project into the pawls in the holes provided for this purpose, are pivoted to the opened valve position. After the intermediate watering or flushing is finished, the worm-gear spindle 28 is screwed (turned) back; as a result, the pawls are spring-returned to their initial position and the pump motor is turned off via switch 29.

In summary, the mechanism to actuate the valves 15 has a valve actuating disk with several adjacent tracks $a$ to $e$ with different numbers of valve control cams 10, 14 and a drive comprising a synchronous motor 2 and a gear reduction drive 3; the valve actuating disk 6 is connected to a gear 5 and the driven shaft of the gear reduction drive 3 is provided with a one-tooth wheel 4; with each revolution, the one-tooth wheel 4 rotates the gear 5 by an angle corresponding to one tooth, and the valve actuating disk 6 remains stationary between the control motions of the gear 5.

With the watering arrangement for plants in accordance with the present invention, the valves 15 are controlled directly by the cams 10, 14 of the valve actuating disk 6 around which the valves 15 are arranged in a circular arc. The valves 15 are located on the different circular tracks $a$ to $e$ of valve actuating disk 6 to which different numbers of valve actuating cams 10, 14 are assigned.

On the circular track $a$ there rotate eight valve actuating cams 14, 45° apart so that the valves assigned to this circular track $a$ are actuated eight times during one rotation of valve actuating disk 6. In circular track $b$, four valve actuating cams 14 rotate 90° apart, so that the valves 15 assigned to this track $b$ are actuated four times during one revolution of valve actuating disk 6. In track $c$, two valve actuating cams 14 rotate 180° apart, so that during one revolution of the valve actuating disk 6, the valves 15 assigned to this track $c$ are actuated twice. Track $d$ is a special case which will be discussed later. In track $e$ a single valve actuating cam 14 rotates so that during one revolution of the valve actuating disk 6, the valves assigned to this track $e$ are actuated once.

In accordance with the present invention, the synchronous motor 2 rotates continuously and drives the gear reduction drive 3 with the one-tooth wheel 4 which makes a single revolution during three hours. The single-tooth wheel 4 actuates the gear 5 once in three hours; the gear is rigidly connected to the valve actuating disk 6. Gear 5 has 64 teeth. Accordingly, the valve actuating disk 6 makes one revolution in $3 \times 64$ hrs = 8 days. This results in the eight-day watering cycle of valves 15 which are assigned to circular track 3 with a single valve actuating cam 14. In 96 hours, i.e., 4 days, the single-tooth wheel 4 actuates 32 teeth of gear 5, with the valve actuating disk 6 making half a revolution. Hence the valves 15 assigned to track $c$ are operated on a four-day cycle. Similarly, valves 15, assigned to circular track $b$ with four actuating cams 14 are actuated in a two-day cycle after a ¼ revolution of the valve actuating disk.

Daily the single-tooth wheel 4 moves eight teeth of gear 5. This results in the daily actuating cycle of valves 15 which are assigned to circular track $a$ with eight actuating cams 14.

The arrangement of actuating cams 14 for the above cycles is symmetrical. For this reason, the actuating cams 15 are fixed on the outer periphery of valve actuating disk 6. A six-day cycle cannot be achieved with fixed actuating cams. Accordingly, these are pivoted on the valve actuating disk 6 and are actuated by a cam disk 9 which runs faster than valve actuating disk 6. For this purpose, a gear reduction drive with gears 5 (64 teeth), 36 (48 teeth), 37 and 38 (56 teeth each) is provided.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. An automatic plant watering arrangement comprising, in combination: water intake means; a plurality of water outflows; valves connected to said water outflows; timer means; time-controlled means connected to said timer means for actuating said valves, means for adjusting said valves individually for different opening cycles; said time-controlled means comprising a synchronous motor with gear reduction means, a single-tooth wheel and mating gear, and valve actuation disk means connected to said gear; said valves comprising water hoses and clamping means for closing and opening said hoses; said clamping means comprising a clamping lever for opening and closing said valves; and pawl means actuated by said clamping lever; water pump and motor means; switch means for controlling the operation of said pump and motor means, said pawl means actuating said switch means; worm-gear spindle means actuated by said pawl means, said pawl means after actuating said worm-gear spindle means tilting said clamping lever for opening all valves.

2. The automatic plant watering arrangment as defined in claim 1, including means for rotating said worm-gear spindle means to vary a respective watering cycle.

3. The automatic plant watering arrangement as defined in claim 2, including marker means with adjustment scale means connected to said valves for setting a desired watering cycle, the positions of said valves being visible through said adjustment scale means.

4. A plant watering arrangement comprising, in combination: water intake means; a plurality of outflow watering lines; valves connected to said watering lines; means for actuating said valves and having a valve actuating disk with a plurality of adjacently located circular tracks with different numbers of valve control cams; a synchronous motor and gear reduction drive means; a gear connected to said valve actuating disk; a one-tooth wheel on said reduction drive means and engaging said gear connected to said disk so that for each revolution said one-tooth wheel rotates said gear by an angle corresponding to one tooth, said valve actuating disk remaining stationary between control motions of said gear, said valves being controlled by said cams, said valves being arranged around said disk, said valves being located on different ones of said circular tracks, different numbers of valve actuating cams being associated with said tracks.

5. An arrangement as defined in claim 4 including spring means for holding said valve actuating disk in said stationary position.

6. An arrangement as defined in claim 4 including a housing; said valve actuating cams being hinged to said valve actuating disk on at least one circular track, a disk cam freely rotatable about the axis of said valve actuating disk for actuating said valve actuating cams, an auxiliary gear rigidly connected to said disk cam, and auxiliary reduction gear drive means in said housng and between said first-mentioned gear and said auxiliary gear.

7. An arrangement as defined in claim 6 wherein said valve actuatiang cams have rollers for engaging said disk cam and return springs for returning said cams to initial positions after being actuated by said disk cams.

8. An arrangement as defined in claim 4, wherein said one-tooth wheel rotates one revolution in three hours, said gear having 64 teeth so that said valve actuating disk rotates one revolution in 192 hours.

9. An arrangement as defined in claim 4, wherein a first one of said circular tracks has eight fixed cams spaced 45° apart, a second circular track having four fixed cams spaced 90° apart, a third circular track having two solid cams spaced 180° apart, a fourth circular track having four movable cams spaced 90° apart, and a fifth circular track having one fixed cam.

10. An arrangement as defined in claim 6 including means applying a gear ratio of 4 to 3 between said valve actuating disk and said disk cam.

11. An arrangement as defined in claim 4 including a housing; said valves being mounted adjustably in said housing and being selectively adjustable on one of said circular tracks to be actuatable by said valve actuating cams.

12. An arrangement as defined in claim 11 including threaded spindles for mounting said valves; pins for guiding said valves; and actuating wheels for actuating said valves.

13. An arrangement as defined in claim 4 wherein each valve comprises a forked slotted valve body with a cross bore through fork legs thereof; a wear-proof elastic hose passing through said cross bore and being a watering line; a pivoted hose clamping lever; spring means; said clamping lever being movable against the action of said spring means by said valve actuating cams for opening and closing said hose.

14. An arrangement as defined in claim 13 including plate means held in a fork bottom of said valve body; pin means for holding said plate means and for closing said hose.

15. An arrangement as defined in claim 13 including a pump with a motor; switch means for actuating said motor; a pawl pivotably mounted in said housing for actuating said switch means; said hose clamping lever having an angled portion engaging said pawl.

16. An arrangement as defined in claim 15 including driving means for said pawl, said valves having all hose clamping levers for actuation by respective pawls, said pawl driving means simultaneously actuating all hose clamping levers and said switch means.

17. An arrangement as defined in claim 4 including means for indicating the position of said valves relative to said circular tracks.

18. An arrangement as defined in claim 4 including miniature valves at the ends of said watering lines for metering water therethrough.

* * * * *